(12) United States Patent
Eddleston et al.

(10) Patent No.: US 10,194,007 B2
(45) Date of Patent: Jan. 29, 2019

(54) CONCURRENT OPTICAL NETWORK TERMINAL SIMULATION

(71) Applicant: Calix, Inc., Petaluma, CA (US)

(72) Inventors: Charles Eddleston, Minneapolis, MN (US); Christopher Thomas Bernard, Wayzata, MN (US); Bharat S. Shah, Maple Grove, MN (US); Scott Allen Moen, Eden Prairie, MN (US); Kishan Prakash Raghunathan, Minnetonka, MN (US)

(73) Assignee: Calix, Inc., Petaluma, CA (US)

( * ) Notice: Subject to any disclaimer, the term of this patent is extended or adjusted under 35 U.S.C. 154(b) by 7 days.

(21) Appl. No.: 15/234,424

(22) Filed: Aug. 11, 2016

(65) Prior Publication Data

US 2018/0048739 A1 Feb. 15, 2018

(51) Int. Cl.
*H04B 10/40* (2013.01)
*H04L 29/06* (2006.01)
*H04L 29/12* (2006.01)
*H04Q 11/00* (2006.01)

(52) U.S. Cl.
CPC .......... *H04L 69/22* (2013.01); *H04L 61/2038* (2013.01); *H04Q 11/0067* (2013.01); *H04L 61/2015* (2013.01)

(58) Field of Classification Search
None
See application file for complete search history.

(56) References Cited

U.S. PATENT DOCUMENTS

| 7,826,378 | B2 | 11/2010 | Absillis et al. |
| 9,300,562 | B2 | 3/2016 | Dufour et al. |
| 2006/0002386 | A1* | 1/2006 | Yik ............ H04L 49/3063 370/389 |
| 2009/0168647 | A1* | 7/2009 | Holness ........... H04L 12/437 370/228 |
| 2009/0324228 | A1 | 12/2009 | Bernard et al. |
| 2011/0249970 | A1* | 10/2011 | Eddleston ........... H04L 12/18 398/58 |
| 2012/0177370 | A1* | 7/2012 | Berman ............ H04L 49/357 398/58 |
| 2013/0315594 | A1* | 11/2013 | Liang ............... H04B 10/27 398/66 |
| 2014/0023366 | A1* | 1/2014 | Zang ................. H04L 41/04 398/58 |

OTHER PUBLICATIONS

"IEEE standard for Ethernet", IEEE Std 802.3-2012 IEEE Computer Society, (2012), 580 pgs.
"ITU-T G.984.3 Series G: Transmission Systems and Media Digital Systems and Networks", Intl Telecommunication Union, (Jan. 20, 2014), 170 pgs.
Thaler, Patricia, et al., "IEEE 802.1Q—Media Access Control Bridges and Virtual Bridged Local Area Networks", IETF 86—Tutorial, (Mar. 10, 2013), 77 pgs.

* cited by examiner

*Primary Examiner* — Kenneth N Vanderpuye
*Assistant Examiner* — David W Lambert
(74) *Attorney, Agent, or Firm* — Schwegman Lundberg & Woessner, P.A.

(57) ABSTRACT

Systems and techniques for concurrent optical network terminal simulation are described herein. A data packet may be received by an optical lint terminal. It may be determined that the data packet is associated with an optical network terminal simulation host. The data packet may be modified based on the determination. The modified data packet may be transmitted to a device.

21 Claims, 6 Drawing Sheets

CONCURRENT OPTICAL NETWORK TERMINAL SIMULATION

TECHNICAL FIELD

This disclosure is generally related to computer networks and, more particularly, to optical network terminal simulation in passive optical networks.

BACKGROUND

A computer network is a collection of interconnected computing devices that may exchange data a share resources. Computer devices on the computer network may communicate with each other using a system of addresses such as internet protocol (IP) addresses. Optical networks may transmit information using signals generated by a laser establishing a channel between devices connected to the optical media. Network providers may wish to verify the operation of hardware and software components of the optical network. Several optical network terminals (ONTs) may be placed on the network to test the operation of hardware and software components of an optical line terminal (OLT).

SUMMARY

In general, this disclosure describes techniques that may provide a unified hardware path for simulated optical network terminal (ONT) traffic and production traffic on a passive optical network (PON). A media access controller of the PON may modify data packets associated with (e.g., received from, destined for, etc.) a simulated ONT so that the data packets appear as production packets to the hardware and software components of the PON. The need for physical ONTs for each service (e.g., feature, component, etc.) on the PON may be reduced and may improve the efficiency of testing the ability of the PON hardware and software to handle an increased ONT load, additional services, and service modifications.

In one example, this disclosure is directed to an optical line terminal (OLT) for optical network terminal (ONT) simulation. The OLT comprises at least one processor, a transceiver, and a memory including instructions that, when executed by the at least one processor, cause the at least one processor to perform operations to receive, via the transceiver, a data packet; determine that the data packet is associated with an ONT simulation host; modify the data packet based on the determination, and transmit, via the transceiver, the modified data packet.

In another example, this disclosure is directed to at least one machine readable medium including instructions for optical network terminal (ONT) simulation that, when executed by an optical line terminal (OLT), cause the OLT to perform operations to receive, via a transceiver, a data packet; determine that the data packet is associated with an ONT simulation host; modify the data packet based on the determination; and transmit, via the transceiver, the modified data packet.

In another example, this disclosure is directed to a method for optical network terminal (ONT) simulation. The method comprises receiving, by an optical line terminal (OLT), a data packet; determining that the data packet is associated with an ONT simulation host; modifying the data packet based on the determination; and transmitting the modified data packet.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
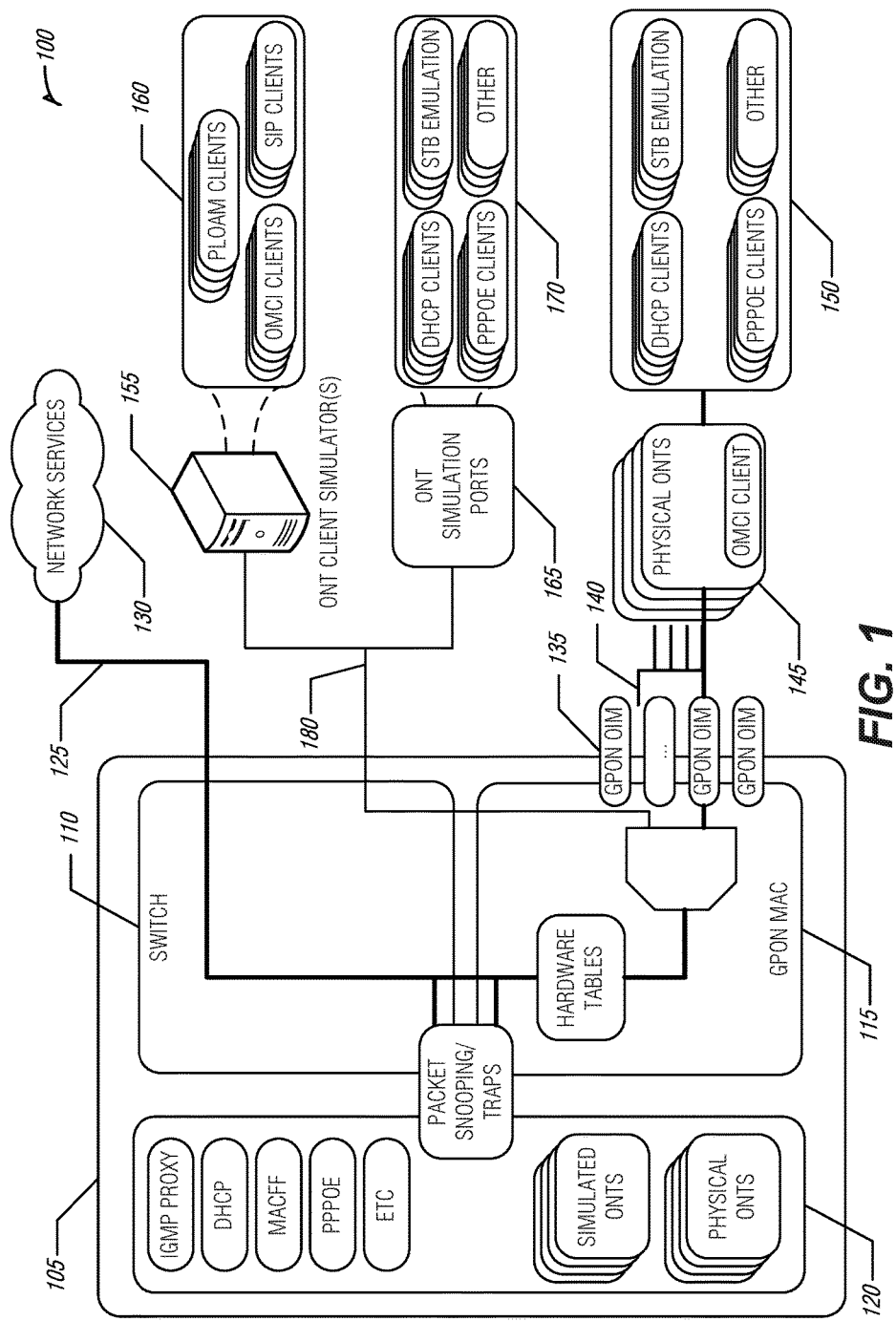
FIG. 1 illustrates an environment and system for concurrent optical network terminal simulation, according to various embodiments.

Gigabit-capable passive optical networks (GPONs) are complex networking systems that may serve a large number of endpoints (e.g., optical network terminals (ONTs) using one or more optical line terminals (OLTs). An entity (e.g., network operators such as internet service providers, device manufacturers such as OLT manufacturers, etc.) may wish to test network components to verify that the components are capable of operating at a designated capacity (e.g., a certain number of connected subscriber ONTs, etc.) and that the components are capable of processing an expected variety of network traffic (e.g., video packets, audio packets, configuration packets, etc.).

The entity may maintain a test network operating independently of a production network for testing the GPON components. However, maintaining two distinct networks may be inefficient as this may result in double operating expenses (e.g., due to space, power, cooling, personnel, hardware, etc.) for the entity. In addition, as subscriber demand grows the entity may have to scale its internal test environments to match customer deployments. For example, on a GPON card with 4 GPON ports, this may mean deploying 64 ONTs for each GPON port resulting in the deployment of 256 ONTs. In an OLT with two 4 port GPON cards, this may mean deploying 512 ONTs.

Deploying physical hardware to match customer configurations may be even more challenging with OLT platforms where as many as 20 cards may be deployed each with 16 GPON ports and each GPON port capable of servicing 128 ONTs where a total of more than 40,000 ONTs may be deployed in a test network. Building such a test system may cost more than $4 million for the ONT hardware, cables, power, and testing equipment. Problems associated with maintaining a distinct physical test network may increase as subscriber demand for high-speed network access grows.

Software simulated ONTs may be used to facilitate scalability testing. The software simulation may operate on the line card itself and may allow large systems of ONTs to be created, updated, and deleted to ensure robustness with larger deployments. Each ONT may have associated services/actions that may stress the software and hardware interfaces. However, the software may track the services in an internal database rather than stressing the services with simulated traffic. Another problem with software simulated ONTs is that it may burden the memory and processor of a system under test which may deviate from an equivalent physical ONT. In addition, the software simulation may be limited to database configuration and no actual packet traffic may be generated and no load may be added on the hardware equipment.

The present subject matter may provide a solution to the problems associated with maintaining a separate test network and with software simulated ONTs for testing service scalability by using the hardware data path without requiring a unique ONT for each service. The present techniques may be deployed on a live passive optical network (PON) (e.g., both simulated and physical ONTs may exist at the same time on the network). This may provide the entity with the ability to maintain a single network rather than two distinct networks. Concurrent ONT simulation may use a field-programmable gate array (FPGA) in a GPON card to route packets in such a way that packets will appear to the system software to have been received from a physical ONT rather than a simulated ONT.

The present subject matter may offload the simulated ONTs to an external server rather than the local line card, which may result in a reduction in memory and processor utilization in the OLT. For example, a server (e.g., running a Linux application, etc.) may run an ONT management and control interface (OMCI) client. When the OMCI client is activated, a physical packet may be sent from the server to the GPON line card. This packet may reach the FPGA GPON MAC, which may convert the packet to look like an upstream OMCI packet and may forward the packet to the system software. This may provide the system software with a packet that may be indistinguishable from a real packet to which it may respond. The FPGA GPON MAC may route the response from the system software back to the server. The OMCI client may simulate a variety of traffic such as, for example, a management information base (MIB) upload, a request for an OMCI download, a routine statistic update, etc. To add additional simulated ONTs, another OMCI client may be launched on the server. For example, a single server may run many clients. The ability to launch multiple simulated ONTs on the server may provide a more efficient way to stress the hardware and software interfaces of the GPON.

The present subject matter may support both physical ONTs and simulated ONTs on the same PON. The physical ONTs may be used to ensure that real-world services are not disrupted. Additionally or alternatively, physical ONTs may be used to test adding additional ONTs to a production network. By concurrently allowing simulated ONTs on the GPON with physical ONTs, the entity may test adding additional clients that may require software resources without having to install physical ONTs. Thus, the production network continues to operate with physical ONTs while simulated ONTs are added to the network to verify hardware and software interfaces (e.g., at higher capacity levels, with new functionality, etc.).

The OLT may process data packets to and from physical ONTs using normal PON termination. However, data packets corresponding to (e.g., destined for a simulated ONT, received from a simulated ONT, etc.) a simulated ONT may be further processed and modified so the data packets may be transmitted between the PON and the ONT simulation network. To accomplish this, the GPON MAC (e.g., included in a line card of the OLT, etc.) may perform multiple types of traffic terminations based on the data packets received. For example, the GPON MAC may perform downstream termination (e.g., packets received at the GPON MAC that are supposed to be transmitted to the GPON network). These packets may be modified and sent to the network uplink destined for the server.

In another example, the GPON MAC may perform upstream termination (e.g., packets received at the GPON MAC from the server that are supposed to be treated as if they were received from the upstream GPON network). These packets may be modified and sent to the upstream data path and may be processed as if they were received on the PON.

In another example, the GPON MAC may perform raw send termination (e.g., software may source different types of messages to the ONTs). Some messages transmitted to ONTs may be standard Ethernet frames and some may be GPON specific messages such as physical layer operations, administration, and maintenance (PLOAM) messages and OMCI messages. These messages may be encapsulated as Ethernet frames before they are sent off the GPON line card to the servers. The messages may be encapsulated because, since they are specific to the GPON protocol stack, they may not contain proper Ethernet packet components.

While the provided examples discuss GPON, it will be understood that the present subject matter may be used in a variety of PONs such as, for example, next generation passive optical network 2 (NG-PON2), 10-gigabit-capable symmetric passive optical network (XGS-PON), Ethernet passive optical network (EPON), etc. It may be noted that the benefits of the present subject matter may increase as the ONT and service capacity of PONs increase.

FIG. 1 illustrates an environment 100 and system 105 for concurrent optical network terminal simulation, according to various embodiments. The environment 100 may represent a passive optical network (PON). The PON may conform to any of a variety of PON standards, such as the broadband PON (BPON) standard (ITU G.983), the 1G Ethernet PON (EPON) standard, the 10G Ethernet PON (EPON) standard, the gigabit-capable PON (GPON) standard (ITU G.984), the 10-gigabit capable PON (XG-PON) standard (ITU G.987), or the 40-gigabit capable PON (NG-PON2) standard (ITU-T G.989) as well as future PON standards under development by the Full Service Access Network (FSAN) Group, ITU, IEEE, and other organizations.

The ITU-T B-PON G.983 standard is described in Recommendation ITU-T G.983.2, Series G: Transmission Systems and Media, Digital Systems and Networks, Digital sections and digital line system—Optical line systems for local and access networks, "ONT management and control interface for B-PON," July 2005.

The 1G EPON standard is described in IEEE Standard 802.3ah-2004-IEEE Standard for Information technology—Telecommunications and information exchange between systems—Local and metropolitan area networks—Specific requirements—Part 3: CSMA/CD Access Method and Physical Layer Specifications Amendment: Physical Layer Specifications and Management Parameters.

The 10G EPON standard is described in IEEE Standard 802.3av-2009-IEEE Standard for Information technology—Local and metropolitan area networks—Specific requirements—Part 3: CSMA/CD Access Method and Physical Layer Specifications Amendment 1: Physical Layer Specifications and Management Parameters for 10 Gb/s Passive Optical Networks.

The ITU-T GPON G.984 standard is described in Recommendation ITU-T G.984.1, Series G: Transmission Systems and Media, Digital Systems and Networks, Digital sections and digital line system—Optical line systems for local and access networks, "Gigabit-capable passive optical networks (GPON): General characteristics," March 2008.

The ITU-T XG-PON G.987 standard is described in Recommendation ITU-T G.987, Series G: Transmission Systems and Media, Digital Systems and Networks, Digital sections and digital line system—Optical line systems for local and access networks, "10-Gigabit-capable passive optical network (XG-PON) systems: Definitions, abbreviations and acronyms," June 2012.

The ITU-T G.989 standard is described in Recommendation ITU-T G.989.1, Series G: Transmission Systems and Media, Digital Systems and Networks, Digital sections and digital line system—Optical line systems for local and access networks, "40-Gigabit-capable passive optical networks (NG-PON2): General requirements, March 2013.

The environment 100 may include a system 105 (e.g., an optical line terminal (OLT) card, etc.) for implementing concurrent optical network terminal (ONT) simulation. The system 105 may include a variety of components such as a switch 110 (e.g., a network switch), a GPON media access controller (GPON MAC) 115, and software 120. The switch 110 may provide a connectivity point for computing devices operating on networks outside the GPON such as those providing network services 130. The switch 110 may be communicatively coupled to the GPON MAC 115. The GPON MAC 115 may provide a connectivity point for computing devices inside the GPON. For example, the GPON MAC may include one or more GPON optical interface modules (GPON OIMs) 135 connecting the GPON MAC 115 to the optical distribution network (ODN) 140 via physical optical media (e.g., fiber optic cable, etc.). The switch 110 and the GPON MAC 115 may be communicatively coupled to the software 120.

The software 120 may analyze incoming packets (e.g., using packet sniffing, traps, etc.) to determine a transmission, if any, to be sent in response to a received packet. The software 120 may include a variety of services such as, for example, internet group management protocol (IGMP) proxy, domain host control protocol (DHCP), MAC-forced forwarding (MACFF), point-to-point protocol over Ethernet (PPPoE), etc. For example, a DHCP packet (e.g., a DHCP request) may be received by the software 120 (e.g., via the switch 110) and the software may identify the packet as a DHCP packet and may provide an appropriate DHCP response (e.g., host configuration information such as IP address, internet gateway, DNS server addresses, etc.).

The system 105 may manage the flow of data on a production network 125 and a simulator network 180. The production network 125 may include one or more physical optical network terminals (ONTs) 145 connected to the ODN 140 that include one or more service clients 150. The one or more service clients may include for example, DHCP clients, PPPoE clients, set-top box (STB) emulator, etc. The GPON MAC 115 may receive traffic from the one or more physical ONTs 145 and may forward the traffic for example to other physical ONTs or to a network services 130 server (e.g., via the switch 110). The system 105 may manage the flow of data between the production network 125 and the simulator network 180 by providing a hardware data path reducing (or eliminating) the need for a unique ONT for each service.

The simulator network may include one or more ONT client simulators 155 (e.g., a server hosting simulated ONTs, etc.) and one or more ONT simulation port 165 (e.g., physical ONT simulator, etc.). The one or more ONT client simulator 155 may include a variety of simulated clients 160 such as, for example, physical layer operations, administration, and maintenance (PLOAM) clients, ONT management and control interface (OMCI) clients, session initiation protocol (SIP) clients, etc. The one or more ONT simulation ports 165 may provide emulated clients 170 such as, for example, DHCP clients, PPPoE clients, STB emulators, etc.

Upon receiving a data packet, the GPON MAC 115 may analyze the data packet to determine if the data packet is from or destined for a client (e.g., a simulated client 160 running on the one or more ONT client simulators 155, an emulated client 170 provided by the one or more ONT simulation ports 165, etc.) on the simulation network 180. The GPON MAC 115 may determine if the received data packet should be processed for downstream termination (e.g., as described in FIG. 2), upstream termination (e.g., as described in FIG. 3), or raw send termination (e.g., as described in FIG. 4). During the processing the GPON MAC 115 may determine that the data packet is from or destined for the client on the simulation network 180. The GPON MAC 115 may modify the data packet so that a data packet from the client on the simulation network 180 may be transmitted to a client on the production network 125 and so that a packet transmitted by a client on the production network 125 may be transmitted to a client on the simulation network 180. Thus, the GPON MAC 115 may make data packets sent to and from simulation clients to appear as production (e.g., non-simulated, from a physical ONT, etc.) data packets. Thus, a unified hardware data path may be provided for simulated ONT traffic and production traffic. Therefore, the data packets from the simulated ONTs will be processed as normal production traffic and may be able to stress the hardware and software components of the GPON to provide a more accurate test of the ability of the GPON to support additional ONT capacity and additional functionality. Using the unified hardware path may reduce the need for unique physical ONTs for testing each service available on the GPON.

The present subject matter may be implemented in various configurations. For example, the switch 110, the GPON MAC 115, and the software 120 may be implemented in different (or the same) computing systems (e.g., an OLT, a single server, a collection of servers, a cloud-based computing platform, etc.). A computing system may comprise one or more processors (e.g., hardware processor 602 described in FIG. 6, etc.) that execute software instructions, such as those used to define a software or computer program, stored in a computer-readable storage medium such as a memory device (e.g., a main memory 604 and a static memory 606 as described in FIG. 6, a Flash memory, random access memory (RAM), or any other type of volatile or non-volatile memory that stores instructions), or a storage device (e.g., a disk drive, or an optical drive). Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
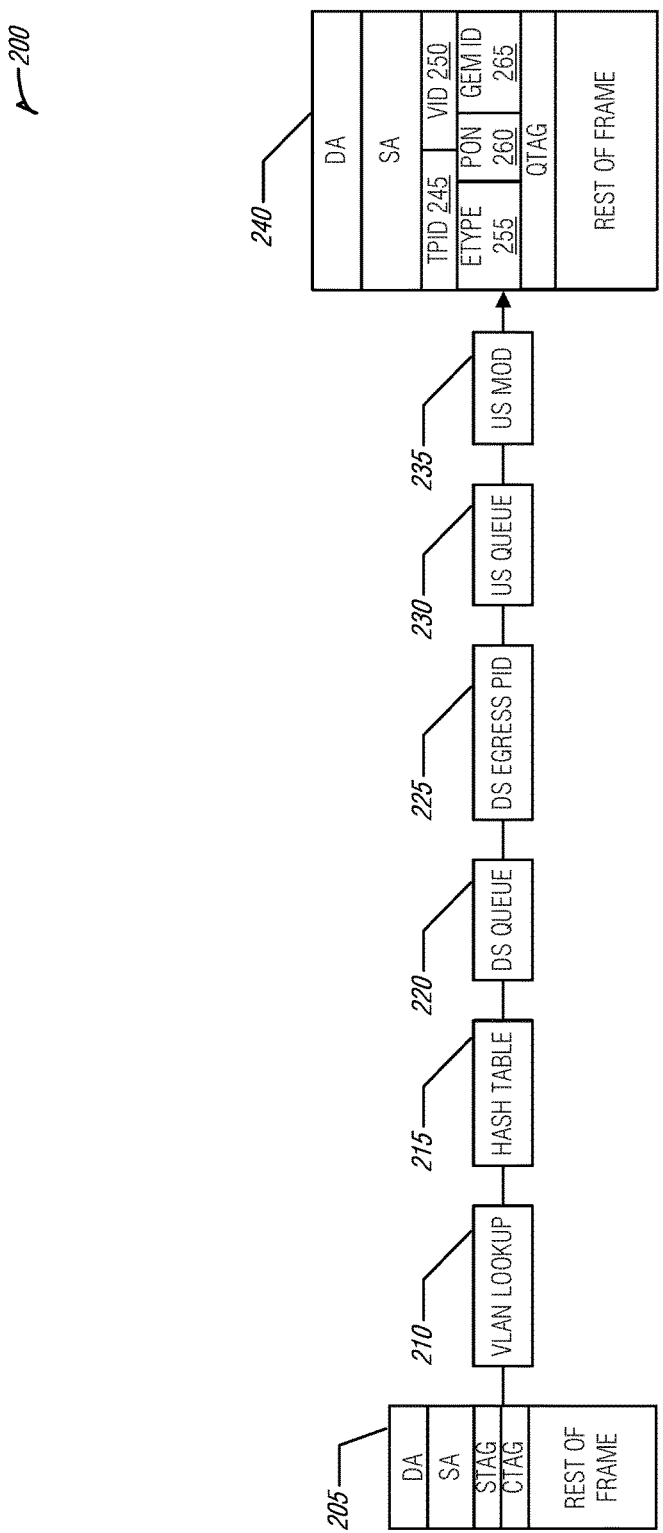
FIG. 2 illustrates an example of a downstream packet termination for concurrent optical network terminal simulation, according to various embodiments.

FIG. 2 illustrates an example of a downstream packet termination 200 for concurrent optical network terminal simulation (ONT), according to various embodiments. An optical line terminal (OLT) (e.g., using GPON MAC 115 as described in FIG. 1) may receive an incoming data packet 205. For example, the OLT may receive the data packet 205 from an Ethernet network. Traffic may flow through the normal downstream processing path. At the end of downstream processing, a GPON emulation method port identifier (GEM PID) lookup may occur. The OLT may complete a virtual local area network (VLAN) lookup 210 to determine if a VLAN (e.g., identified using an stag field of the data packet 205, identified using a ctag field of the data packet 205, etc.) included in the data packet 205 maps to a GEM ID. At this point, the data packet 205 may be identified for downstream termination (e.g., the data packet 205 is destined for a simulation client on the simulation network 180 as described in FIG. 1).

The OLT may internally loop the data packet 205 back to an upstream port and may insert two words of routing data. The first word of routing data may be an IEEE 802.1Q VLAN that may route the modified data packet 240 to a client simulation server (e.g., the one or more ONT client simulators 155 as described in FIG. 1). The first word of routing data may include a tag protocol identifier (TPID) 245 and a VLAN ID (VID) 250. The TPID may be a standard 802.1Q TPID (e.g., with a value of 0x8100, 0x88a8, 0x9100). For example, the TPID may have a value of 0x8100. The VID may be a standard 802.1Q VID. The VID may be a VLAN routing tag used to direct the modified data packet 240 to the client simulation server.

The second word of routing data may comprise a special EtherType and a sixteen bit header. This sixteen bit header may contain a specific GPON port and GEM port ID associated with the modified data packet 240 which may allow the packet to be routed to the client simulation server. The second word of routing data may include an EtherType (ETYPE) 255, a passive optical network (PON) 260, and a GEM ID 265. The ETYPE may be a standard IEEE 802.3 EtherType. For example, the ETYPE may have a value of a local experimental value of 0x88b5 to denote the data packet 205 as a simulation ONT packet. The PON may denote from which PON (e.g., a PON of the ODN 140 as described in FIG. 1, etc.) the data packet 205 originated. In an example, the PON may be a three bit value that may allow up to 8 PON ports to use the same VID. The GEM ID may be a standard G.984.3 GEM Port ID. In an example, the GEM ID may be a twelve bit field that may allow a full GEM Port ID to reach a simulation client. Once the modification to the data packet 205 has been completed, the modified data packet 240 may be transmitted to the simulation client of the client simulation server.

Figure 3:
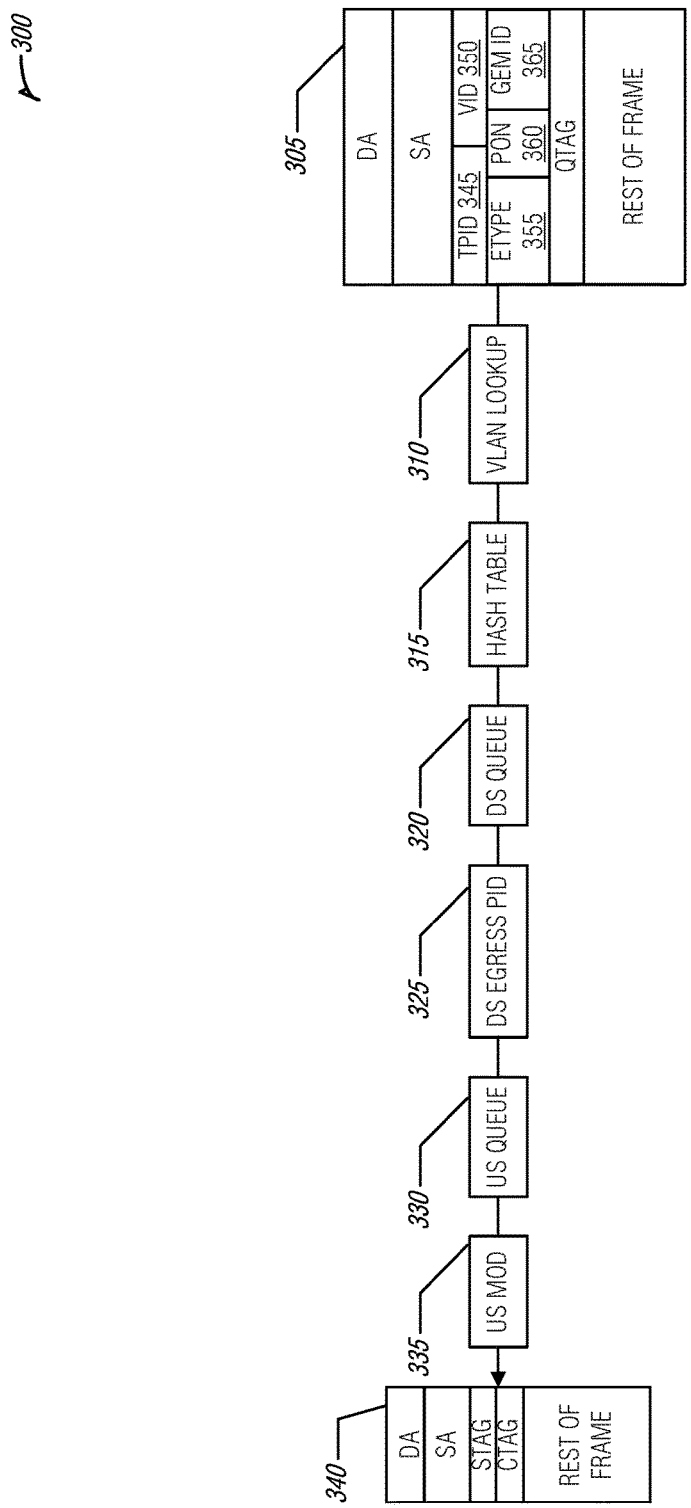
FIG. 3 illustrates an example of an upstream packet termination for concurrent optical network terminal simulation, according to various embodiments.

FIG. 3 illustrates an example of an upstream packet termination 300 for concurrent optical network terminal simulation, according to various embodiments. An optical line terminal (OLT) (e.g., using GPON MAC 115 as described in FIG. 1) may receive an incoming data packet 305. For example, the OLT may receive the data packet 305 from an Ethernet network. The OLT may determine that the data packet 305 includes a virtual local area network identifier (VID). For example, the OLT may determine that the data packet 205 includes a VID indicating that the data packet 205 has been received from a client simulation server (e.g., the one or more ONT client simulators 155 as described in FIG. 1).

The OLT may identify an EtherType (ETYPE) 355 for the data packet 305. For example, the OLT may determine that the ETYPE 355 has a value of 0x88b5. The OLT may decode the data packet 305 to determine a GPON port for the data packet. For example, the OLT may use a passive optical network (PON) 360 value to determine the GPON port for the data packet 305. The OLT may then modify the data packet 305 to remove the VID 350, ETYPE 355, PON 360, a tag protocol identifier (TPID) 345, and a GPON emulation method identifier (GEM ID) 365 from the data packet 305.

Once the data packet 305 has been modified, the modified data packet 340 may be transmitted to a client on the GPON (e.g., a client on the ODN 140 as described in FIG. 1, etc.).

Figure 4:
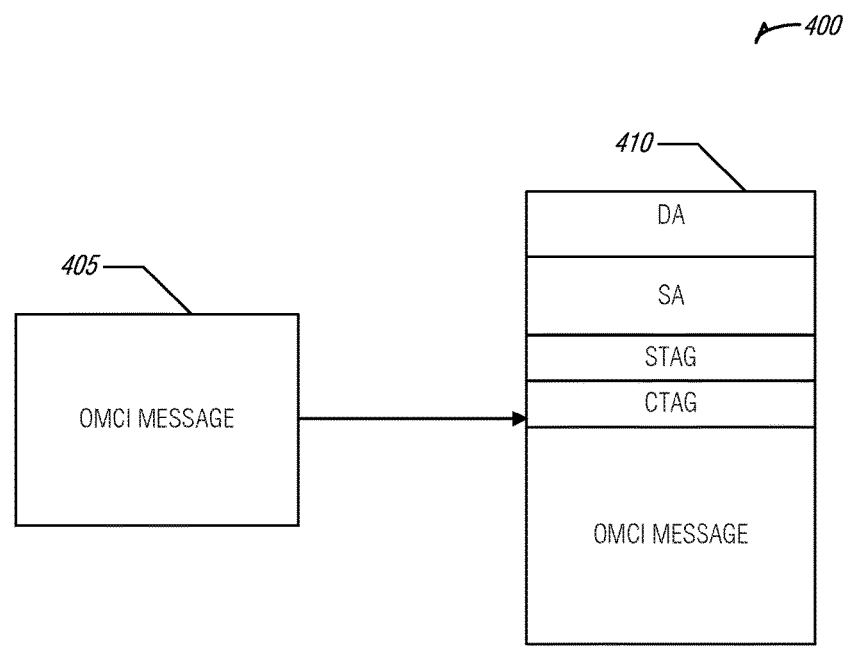
FIG. 4 illustrates an example of a raw send packet termination for concurrent optical network terminal simulation, according to various embodiments.

FIG. 4 illustrates an example of a raw send packet termination 400 for concurrent optical network terminal simulation, according to various embodiments. An optical line terminal (OLT) may transmit network passive optical network (PON) specific messages to optical network terminals (ONTs) on the PON. The messages may include OLT management and control interface (OMCI) messages that may provide configuration information to the ONTs (e.g., firmware images, settings, etc.) and physical layer operations, administration, and maintenance (PLOAM) messages (e.g., low-level configuration messages for managing ONT hardware and firmware settings, etc.). Data packets for PON specific messages may lack the layer 2 information used to transmit the messages outside of the PON. In order to transmit a PON specific message outside of the PON, the message may be encapsulated to provide the information used to transmit the message outside the PON.

The OLT (e.g., using GPON MAC 115 as described in FIG. 1) may receive an incoming PON message 405. The OLT may modify the message 405 to transform it into a data packet 410 for transmission on a network outside the PON (e.g., the simulation network 180 as described in FIG. 1). In an example, the OLT may add layer 2 header information to the message. For example, the OLT may add a destination media access control (MAC) address and a source MAC address to the message. In some examples, virtual local area network (VLAN) tags may be added to the message. Once the message 405 has been modified, a data packet 410 may be transmitted to a client on the network outside the PON (e.g., a client simulation server of the one or more client simulation servers 155 as described in FIG. 1).

The terminations described in FIGS. 2-4 may allow the OLT to pass traffic to and from the simulation network for processing as production traffic by the hardware and software components of the GPON. The modifications to the data packets allow the simulated ONT traffic to share a hardware data path with production network traffic. Thus, the need to add unique physical ONTs for each service available on the GPON may be reduced. Therefore, the hardware and software components may be tested for capacity and service compatibility without adding additional hardware components to the GPON which may result in more efficient network testing.

Figure 5:
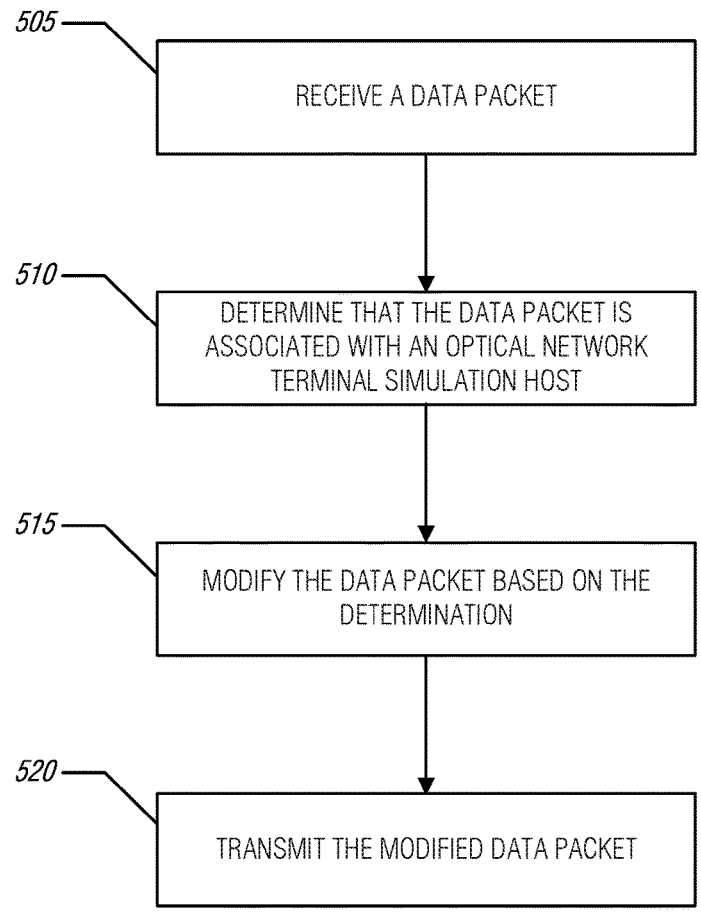
FIG. 5 illustrates a flowchart of an example of a method for concurrent optical network terminal simulation, according to various embodiments.

FIG. 5 illustrates a flowchart of an example of a method 500 for concurrent optical network terminal simulation, according to various embodiments. The method 500 may provide similar functionality as described in FIGS. 1-4.

At operation 505, an optical line terminal (OLT) (e.g., the system 105 as described in FIG. 1) may receive a data packet. In an example, the OLT may include a passive optical media access controller (PON MAC) (e.g., the GPON MAC 115 as described in FIG. 1) and the data packet may be processed (e.g., to make determinations about source and destination of the data packet, etc.) by the PON MAC. In an example, the data packet may be an Ethernet packet.

At operation 510, the OLT may determine that the data packet is associated with (e.g., corresponds to, is destined for, is received from, etc.) an optical network terminal (ONT) simulation host (e.g., an ONT client simulator 155 as described in FIG. 1, etc.). In an example, the OLT may determine that the data packet includes a passive optical network (PON) port identifier (PID) (e.g., a gigabit-capable PON encapsulation method PID, etc.) and may determine that the data packet is destined for the ONT simulation host using the PID. In an example, the OLT may identify that the data packet includes a virtual local area network identifier (VLAN ID) and the OLT may determine an EtherType and a PON port for the data packet based on the VLAN ID. In an example, the OLT may determine that the data packet includes a PON specific message. In an example, the PON specific message may be an ONT management and control interface (OMCI) message.

At operation 515, the OLT may modify the data packet based on the determination that the data packet is associated with to the ONT simulation host. In an example, the OLT may modify the data packet to include a first word of routing data and a second word of routing data. In an example, the first word of routing data may include the VLAN ID. In an example, the second word of routing data may include a reserved EtherType and a designated header. In an example, the designated header may include a PON port and the PID. In an example, the OLT may modify the data packet by removing a VLAN ID, an EtherType, and a PON port from the data packet. In an example, the OLT may modify the data packet by encapsulating the data packet with a destination media access control (MAC) address and a source MAC address.

At operation 520, the OLT may transmit the modified data packet. For example, the modified data packet may be transmitted to the ONT simulation host, a device on the PON, etc. In an example, the OLT may transmit the modified data packet to the ONT simulation host using the first word of routing data and the second word of routing data. In an example, the OLT may queue the modified data packet for transmission to a device (e.g., a physical ONT, hardware and software providing a service, etc.) on the PON. In an example, the OLT may transmit the modified data packet over an Ethernet network. In an example, the OLT may encapsulate the data packet and may transmit the encapsulated data packet to the ONT simulation host. In an example, the OLT may transmit the encapsulated data packet over an Ethernet network.

Figure 6:
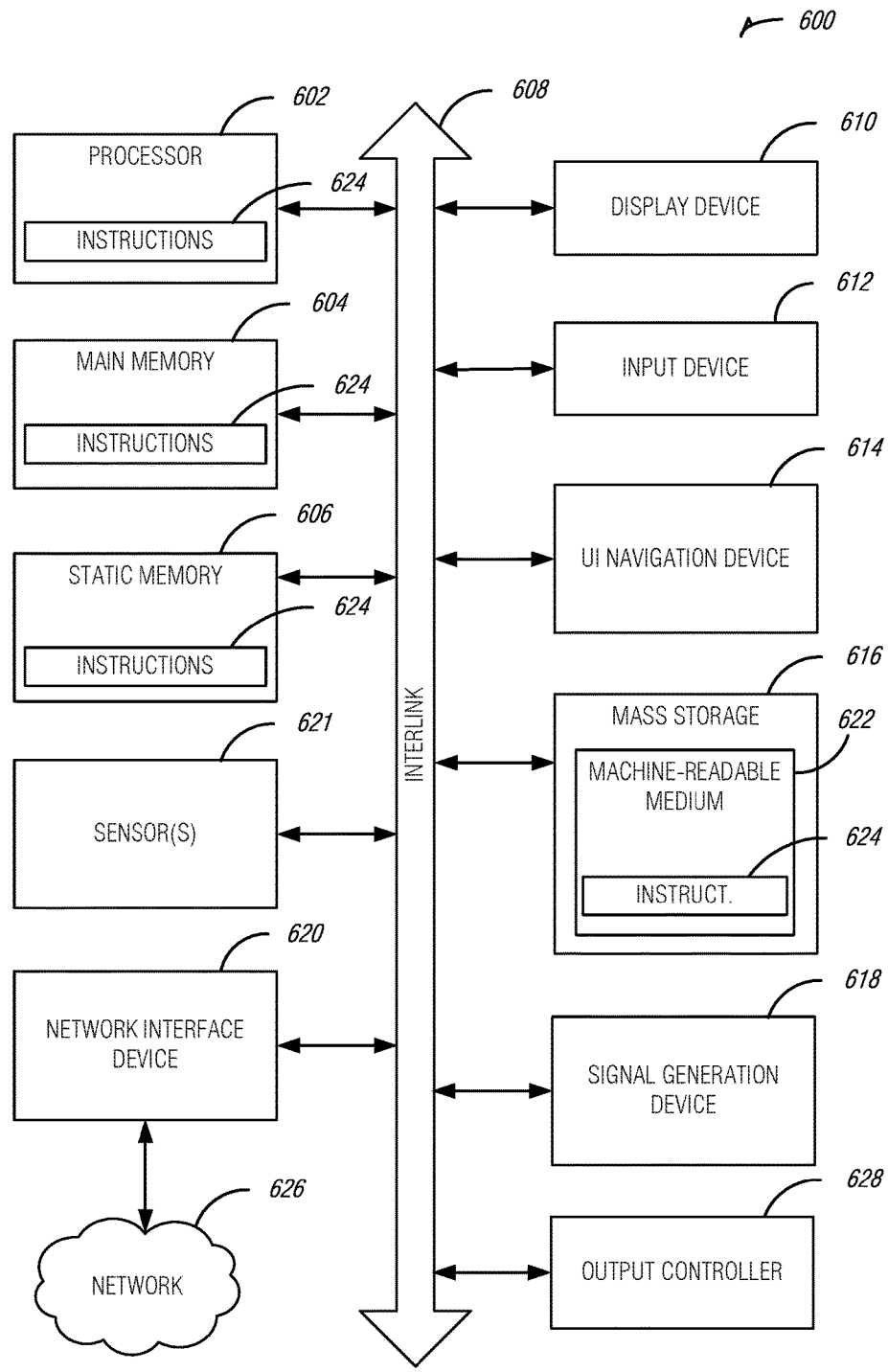
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

What is claimed is:

1. An optical line terminal (OLT) for optical network terminal (ONT) simulation, the OLT comprising:
    at least one processor;
    a transceiver; and
    a memory including instructions that, when executed by the at least one processor, cause the at least one processor to perform operations to:
        receive, via the transceiver, a data packet;
        identify a passive optical network (PON) port identifier (PID) in the data packet,
        wherein the PID is an emulation method port identifier;
        determine that the data packet is associated with an ONT simulation host, wherein the ONT simulation host is a server device hosting a simulated ONT client from which the data packet originates;
        determine the data packet is destined for the ONTO simulation host using the PID;
        modify the data packet based on the determination to alter a characteristic such that the modified data packet indicates an origination from a non-simulated ONT client rather than the simulated ONT client, wherein the modification includes addition of a first word of routing data and a second word of routing data, wherein the second word of routing data includes a designated header, and wherein the designated header includes the emulation method port identifier: and
        transmit, via the transceiver, the modified data packet, wherein the modified data packet is transmitted to the ONT simulation host using the first word of routing data and the second word of routing data.

2. The OLT of claim 1, wherein the first word of routing data includes a virtual local area network identifier (VLAN ID).

3. The OLT of claim 1, wherein the second word of routing data includes a reserved EtherType.

4. The OLT of claim 3, wherein the designated header includes a PON port.

5. The OLT of claim 1, wherein the instructions to determine that the data packet is associated with the ONT simulation host further comprise instructions that cause the at least one processor to perform operations to:
    identify a virtual local area network identifier (VLAN ID) in the data packet; and
    determine, in response to identifying the VLAN ID, an EtherType and a passive optical network (PON) port for the data packet, wherein the instructions to modify the data packet include instructions to remove the VLAN ID, EtherType, and the PON port, and wherein the instructions to transmit the modified data packet include instructions to queue the modified data packet for transmission to a device on the PON.

6. The OLT of claim 1, wherein the instructions to determine that the data packet is associated with the ONT simulation host further comprises instructions that cause the at least one processor to perform operations to:
    determine that the data packet includes a passive optical network (PON) specific message; and
    identify that the PON specific message is destined for the ONT simulation host, wherein the instructions to modify the data packet include instructions to encapsulate the data packet with a destination media access control (MAC) address and a source MAC address, and wherein the instructions to transmit the modified data packet include instructions to transmit the encapsulated PON specific message to the ONT simulation host.

7. The OLT of claim 6, wherein the PON specific message is an ONT management and control interface (OMCI) message.

8. The OLT of claim 6, wherein the instructions to transmit the encapsulated PON specific message include instructions to transmit the PON specific message over an Ethernet network.

9. The OLT of claim 1, wherein the data packet is an Ethernet packet.

10. The OLT of claim 1, further comprising a passive optical network media access controller (PON MAC), wherein the instructions to receive the data packet include instructions to process the data packet using the PON MAC.

11. At least one non-transitory machine readable medium including instructions for optical network terminal (ONT) simulation that, when executed by an optical line terminal (OLT), cause the OLT to perform operations to:
    receive, via a transceiver, a data packet;
    identify a passive optical network (PON) port identifier (PM) in the data packet, wherein the PID is an emulation method port identifier;

determine that the data packet is associated with an ONT simulation host, wherein the ONT simulation host is a server device hosting a simulated ONT from which the data packet originates;

determine the data packet is destined for the ONT simulation host using the PID;

modify the data packet based on the determination to alter a characteristic such that the modified data packet indicates an origination from a non-simulated ONT client rather than the simulated ONT client, wherein the modification includes addition of a first word of routing data and a second word of routing data, wherein the second word of routing data includes a designated header, and wherein the designated header includes the emulation method port identifier; and transmit, via the transceiver, the modified data packet, wherein the modified data packet is transmitted to the ONT simulation host using the first word of routing data and the second word of routing data.

12. The at least one non-transitory machine readable medium of claim 11, wherein the first word of routing data includes a virtual local area network identifier (VLAN ID).

13. The at least one non-transitory machine readable medium of claim 11, wherein the second word of routing data includes a reserved EtherType.

14. The at least one non-transitory machine readable medium of claim 13, wherein the designated header includes a PON port.

15. The at least one non-transitory machine readable medium of claim 11, wherein the instructions to determine that the data packet is associated with the ONT simulation host further comprises instructions that cause the at least one processor to perform operations to:

identify a virtual local area network identifier (VLAN ID) in the data packet; and determine, in response to identifying the VLAN ID, an EtherType and a passive optical network (PON) port for the data packet, wherein the instructions to modify the data packet include instructions to remove the VLAN ID, EtherType, and the PON port, and wherein the instructions to transmit the modified data packet include instructions to queue the modified data packet for transmission to a device on the PON.

16. The at least one non-transitory machine readable medium of claim 11, wherein the instructions to determine that the data packet is associated with the ONT simulation host further comprises instructions that cause the at least one processor to perform operations to:

determine that the data packet includes a passive optical network (PON) specific message; and identify that the PON specific message is destined for the ONT simulation host, wherein the instructions to modify the data packet include instructions to encapsulate the data packet with a destination media access control (MAC) address and a source MAC address, and wherein the instructions to transmit the modified data packet include instructions to transmit the encapsulated PON specific message to the ONT simulation host.

17. The at least one non-transitory machine readable medium of claim 16, wherein the PON specific message is an ONT management and control interface (OMCI) message.

18. The at least one non-transitory machine readable medium of claim 16, wherein the instructions to transmit the encapsulated PON specific message include instructions to transmit the PON specific message over an Ethernet network.

19. The at least one non-transitory machine readable medium of claim 11, wherein the data packet is an Ethernet packet.

20. The at least one non-transitory machine readable medium of claim 11, wherein the OLT includes a passive optical network media access controller (PON MAC), and wherein the instructions to receive the data packet include instructions to process the data packet using the PON MAC.

21. A method for optical network terminal (ONT) simulation, the method comprising:

receiving, by an optical line terminal (OLT), a data packet;

identifying a passive optical network (PON) port identifier (PID) in the data packet, wherein the PID is an emulation method port identifier;

determining that the data packet is associated with an ONT simulation host, wherein the ONT simulation host is a server device hosting a simulated ONT client from which the data packet originates;

determining the data packet is destined for the ONT simulation host using the PID;

modifying the data packet based on the determination to alter a characteristic such that the modified data packet indicates an origination from a non-simulated ONT client rather than the simulated ONT client, wherein the modifying includes adding a first word of routing data and a second word of routing data to the data packet, wherein the second word of routing data includes a designated header, and wherein the designated header includes the emulation method port identifier; and transmitting the modified data packet, wherein the modified data packet is transmitted to the ONT simulation host using the first word of routing data and the second word of routing data.

* * * * *